United States Patent [19]

Tanaka

[11] Patent Number: 5,537,386
[45] Date of Patent: Jul. 16, 1996

[54] TRACKING AND FOCUSING SERVO DRIVEN BY COMPARISON OF DIRECT CURRENT SIGNALS RECTIFIED FROM DETECTORS

[75] Inventor: Haruo Tanaka, Kyoto, Japan

[73] Assignee: Rohm Co., Ltd., Kyoto, Japan

[21] Appl. No.: 220,497

[22] Filed: Mar. 31, 1994

[30] Foreign Application Priority Data

Apr. 12, 1993 [JP] Japan .................................. 5-084871

[51] Int. Cl.$^6$ .................................................. G11B 7/085
[52] U.S. Cl. ........................ 369/120; 369/44.37; 369/122
[58] Field of Search ................................ 369/120, 44.25, 369/44.37, 44.41, 44.27, 44.29, 44.35, 44.32, 122, 116, 48, 54

[56] References Cited

U.S. PATENT DOCUMENTS

| | | | |
|---|---|---|---|
| 5,103,439 | 4/1992 | Bierhoff et al. | 369/44.27 |
| 5,212,675 | 5/1993 | Yoshino et al. | 369/44.36 |
| 5,351,224 | 9/1994 | Nagata et al. | 369/44.29 |
| 5,383,169 | 1/1995 | Shinoda et al. | 369/44.13 |
| 5,392,304 | 2/1995 | Tanaka et al. | 369/122 |

*Primary Examiner*—Georgia Y. Epps
*Assistant Examiner*—Kim-Kwok Chu
*Attorney, Agent, or Firm*—Nikaido, Marmelstein, Murray & Oram

[57] ABSTRACT

There is provided an optical pickup adapted to read out signals recorded in an optical disk, which is capable of detecting tracking error signals and focusing error signals with good precision even when applied to the SCOOP method, and includes at least three light-emitting parts each capable of emitting laser beam, a detection part provided in association with each of the light-emitting parts for detecting a variation of an output in the light-emitting part associated therewith which is caused by the laser beam reflected by the optical disk, a tracking servo mechanism and a focusing servo mechanism, the servo mechanisms being adapted to be driven in response to signals respectively output by the detection parts for correcting a focusing point of the laser beam, wherein the detection parts each connected to a capacitor and an amplifier sequentially, at least two of the detection parts being each further connected to a rectifier after the amplifier to turn each of the signals respectively output by the detection parts into a direct current component signal, and wherein the tracking servo mechanism and/or the focusing servo mechanism is driven corresponding to a result of comparison between two of the direct current component signals output by the respective rectifiers.

6 Claims, 8 Drawing Sheets

TRACKING AND FOCUSING SERVO DRIVEN BY COMPARISON OF DIRECT CURRENT SIGNALS RECTIFIED FROM DETECTORS

BACKGROUND OF THE INVENTION

The present invention relates to optical pickups and, more particularly, to a small-size optical pickup capable of correcting tracking errors and focusing errors with good precision without employing expensive optical components.

High-density recording is feasible by using laser beam for read/write operation since such an operation is achieved by, in principle, focusing light on a spot having a diameter substantially equal to the wavelength of the laser beam used. Typically used in the optical recording there is used an optical disk (hereinafter referred to as "OD") as an information recording medium and an optical pickup using a semiconductor laser device as means for achieving writing to and reading out of the OD.

Pits provided in the OD and storing information signals are of about 0.9 μm in size each, and lines of pits, or tracks, are arranged with a narrow pitch of about 1.6 μm. Accordingly, in a practical pickup operation the detection of pits must be achieved while correcting a displacement of a track in a direction perpendicular to the tracks or a focusing deviation due to irregularities caused by revolution of the OD.

A conventional pickup employs an optical element, such as half mirror or hologram, as a beam splitter and is adapted to split light reflected from an OD to detect pits. In this case, a displacement of a track in a direction perpendicular to the tracks in the plane of of the OD is corrected by, for example, the 3-beam method in which light from one laser diode (hereinafter referred to as "LD") as a light source is split into three beams by diffraction grating and these beams are used to correct errors, while a focusing error is detected by, for example, the astigmatism method using a cylindrical lens.

Alternatively, there is developed a SCOOP (Self Coupled Optical Pickup) method as disclosed, for example, Japanese Unexamined Patent Publication No. 72688/1991, wherein light reflected by an OD is returned to an LD (such light will be referred to as "returning light") and a signal is detected utilizing a change in oscillation state of the LD due to returning light. The objective of the SCOOP method is to reduce the number of optical components, such as beam splitter and cylindrical lens, as used in the aforesaid conventional pickup, to reduce the cost, and to facilitate precise positioning.

Figure 7:
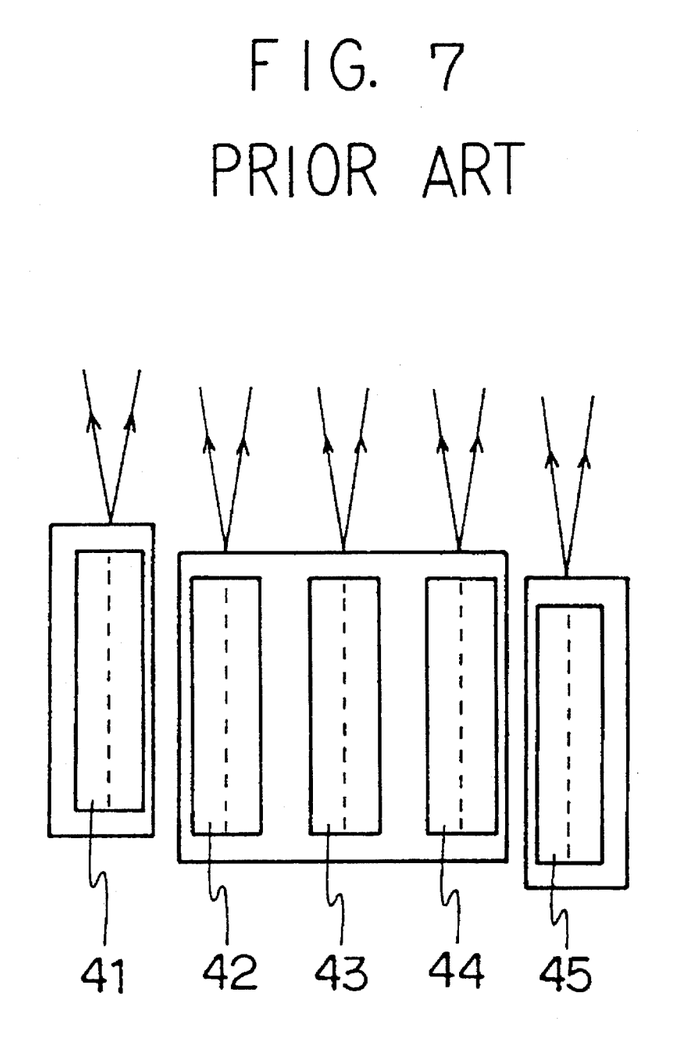
FIG. 7 is a schematic representation showing an example of an arrangement of semiconductor laser systems for use in a conventional SCOOP method.

In this SCOOP method there are used, for example, five LDs 41 to 45 which are linearly arranged as shown in FIG. 7. The central LD 43 is for detecting recorded signals, LDs 42 and 44 on both sides of LD 43 are each for detecting tracking error signals, and the outermost LDs 41 and 45 are each for detecting focusing error signals and are slightly shifted in opposite directions along the optical axis. These LDs for detecting error signals allow tracking errors and focusing errors to be detected. In detecting these signals a differential amplifier directly compares two signals respectively detected by the LDs for detecting tracking error signals with each other to output a tracking error signal, while another one directly compares two signals respectively detected by the LDs for detecting focusing error signals with each other to output a focusing error signal. These error signals cause the respective servo mechanisms to be driven.

Figure 8:
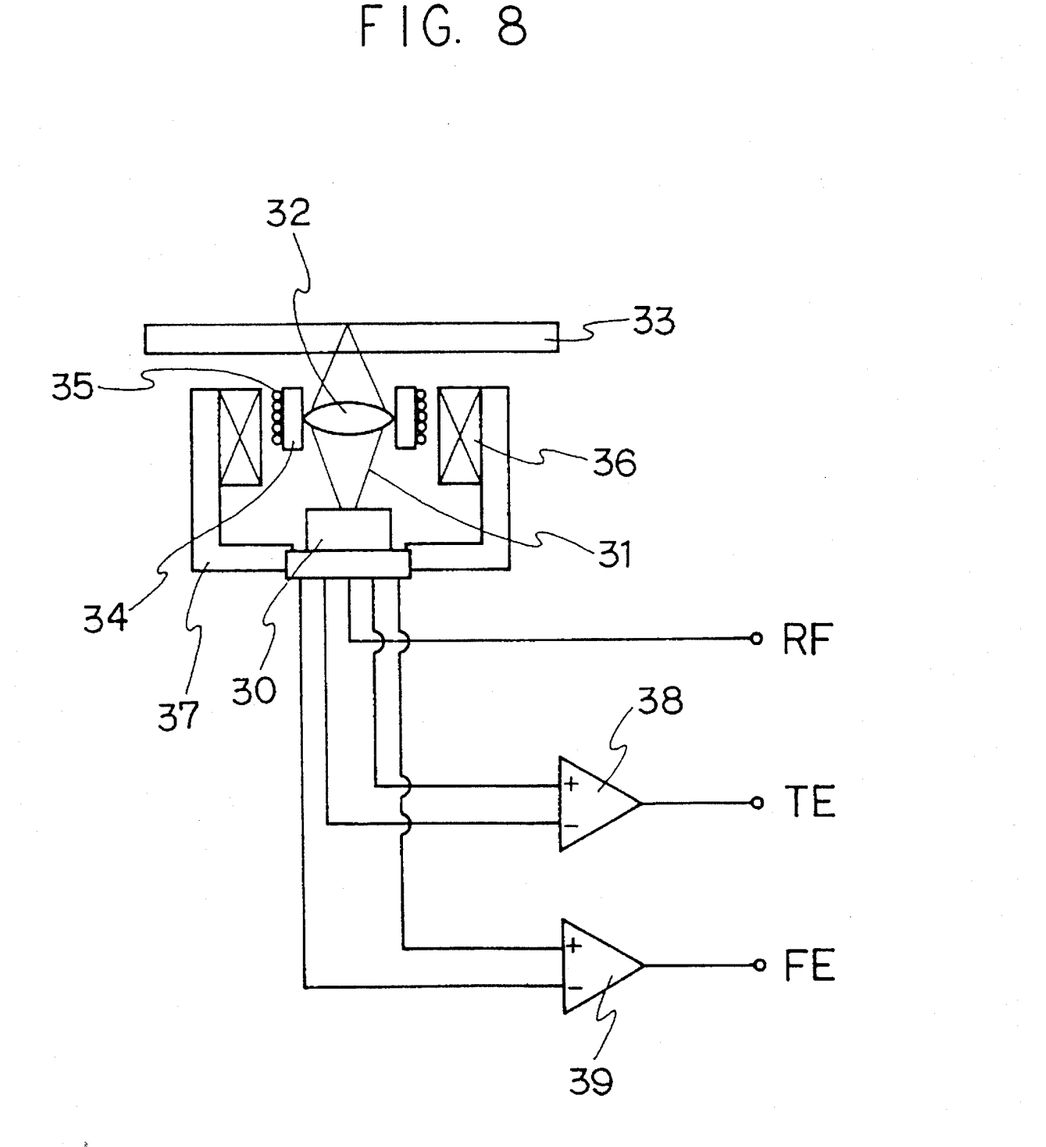
FIG. 8 is a schematic representation showing an example of a conventional optical pickup.

Referring to FIG. 8, laser beam 31 emitted from an LD chip 30 (in this figure only the light emitted from one light-emitting part is illustrated) passes through an objective lens 32 and is then reflected by a recording surface of an OD 38. The oscillation state of the LD which is coupled with the reflected light is detected by a detection part (not shown). A pair of signals detected by the detection part are compared with each other and amplified by a differential amplifier 38, while another pair of signals detected by the detection part are compared with each other and amplified by another differential amplifier 39. The respective outputs of the differential amplifiers 38 and 39 serve as a tracking error signal TE and a focusing error signal FE. A signal RF representative of information recorded in the OD is directly fed to a signal-processing circuit. The tracking error signal TE and the focusing error signal FE cause the respective servo mechanisms to operate, whereby the position of the objective lens is adjusted using the combination of an electromagnetic coil 35 and a permanent magnet 36 disposed in a casing 37.

According to the foregoing SCOOP method, the detection part must detect a slight variation in steady emission state of an LD due to returning light. Where the quantity of light emitted from an LD is detected by the detection part formed of, for example, a photodiode (hereinafter referred to as "PD"), the output of the PD (corresponding to the quantity of light emitted from the LD in its steady emission state) is 200 μA, while the quantity of a variation due to returning light is very small, or as small as about 2 to about 50 μm. For this reason, a differential amplifier of good precision is required to compare voltages with each other of the detection part formed of the PD. Further, even if such a differential amplifier is used, there is a problem that even a slight amount of noise frequently leads to an erroneous signal.

It is, therefore, an object of the present invention to overcome the foregoing problems and to provide an optical pickup which is applicable even to the method wherein a variation, caused by returning light, of the oscillation state of an LD is detected to read a signal recorded in an OD, and is capable of detecting tracking error signals and focusing error signals with good precision.

SUMMARY OF THE INVENTION

According to the present invention, there is provided an optical pickup adapted to read out signals recorded in an optical disk, comprising at least three light-emitting parts each capable of emitting laser beam, a detection part provided in association with each of the light-emitting parts for detecting a variation of an output in the light-emitting part associated therewith which is caused by the laser beam reflected by the optical disk, a tracking servo mechanism and a focusing servo mechanism, the servo mechanisms being adapted to be driven in response to signals of the detection parts for correcting a tracking error and a focusing error of the laser beam, wherein the detection parts each connected to a capacitor and an amplifier sequentially, at least two of the detection parts being each further connected to a rectifier after the amplifier to turn each of the signals of the detection parts into a direct current component signal, and wherein the tracking servo mechanism and/or the focusing servo mechanism is driven corresponding to a result of comparison between two of the direct current component signals output by the respective rectifiers.

It is preferable that the detecting parts include photodiodes provided on the back side of the light-emitting parts and a current to voltage converting means for transforming an output current to a voltage, and wherein an output voltage component from said current to voltage converting means is connected to the amplifier.

It is preferable that the light-emitting part is formed with a laser diode, each of the detecting parts a means for detecting a voltage applied to each of the laser diode.

It is preferable that at least three pieces of said light-emitting parts and the detecting parts are respectively formed with the laser diodes and the photodiodes, wherein at least two pieces of said laser diodes are arranged in such a manner that one vertical plane to the tracking direction of the light-emitting surface of one diode is not coplanar with another vertical plane of the light-emitting surface of another diode, and wherein at least two pieces of said laser diodes are arranged in such a manner that one horizontal plane is not coplanar with another horizontal plane of the light-emitting surface of another diode.

Preferably, the optical pickup of the present invention has three pairs of the light-emitting part and the detection part, the direct current component signal derived from the output of the detection part of a first pair of the three pairs being compared with that derived from the output of the detection part of a second pair of the three pairs to form a tracking servo signal and with that derived from the output of the detection part of a third pair of the three pairs to form a focusing servo signal, the amplifier associated with the first pair outputting an RF signal representative of a signal recorded in the optical disk, whereby the number of pairs of the light-emitting part and the detection part can be minimized.

Further, preferably, the optical pickup of the present invention has at least three pairs of the light-emitting part and the detection part and further comprises a time axis correction circuit branched from the output of the ampilfier connected to the detection part of a second pair of the at least three pairs for making coincide a time axis of a second signal detected by the detection part of the second pair with that of a first signal detected by the detection part of a first pair of the at least three pairs, and an adder for adding the second signal corrected by the time axis correction circuit to the first signal to output an RF signal representative of a signal recorded in the optical disk, whereby noise of the detected signal is reduced.

The present invention utilizes the fact that tracking error signals and focusing error signals are modulated by a high frequency corresponding to repeating pits of an optical disk to extract and amplify only the high frequency component of a variation in the emission state of an LD, the variation being caused by returning light from the recording surface of an OD. The amplitudes of the signals thus amplified are converted into direct current components, which are in turn compared with each other. Hence, even a slight variation in the emission state of the LD can be detected, assuring precise tracking servo and focusing servo functions.

Further, the signals recorded in the OD can be read by directly processing the output of the amplifier for high frequency component. Hence, the pair of light-emitting part and detection part for RF signals representative of the signals recorded in the OD can also serve to output a signal as one of the two tracking error signals or of the two focusing error signals.

Still further, since the pair of light-emitting part and detection part for tracking error signals and that for focusing error signals scan the track of the OD together with the pair for RF signals, between signals respectively output from the three pairs is there only a time delay corresponding to the spacing between the light-emitting parts. Hence, compensating for the time delay by correcting the time axis of the signal delayed, then adding the signal compensated for the time delay to the signal with no time delay makes it possible to intensify the RF signal and to reduce its noise to $1/n^{1/2}$ where n is the number of signals to be added to each other.

BRIEF DESCRIPTION OF THE DRAWINGS

FIGS. 1(a) and 1(b) show one embodiment of a circuit for signal-processing an output of a photodetector included in an optical pickup according to the present invention, and wherein

FIGS. 4(a) and 4(b) show a semiconductor laser system for use in one embodiment of an optical pickup according to the present invention, and wherein

DETAILED DESCRIPTION OF THE DRAWINGS

The present invention will now be described in detail with reference to the drawings.

Figure 4A:
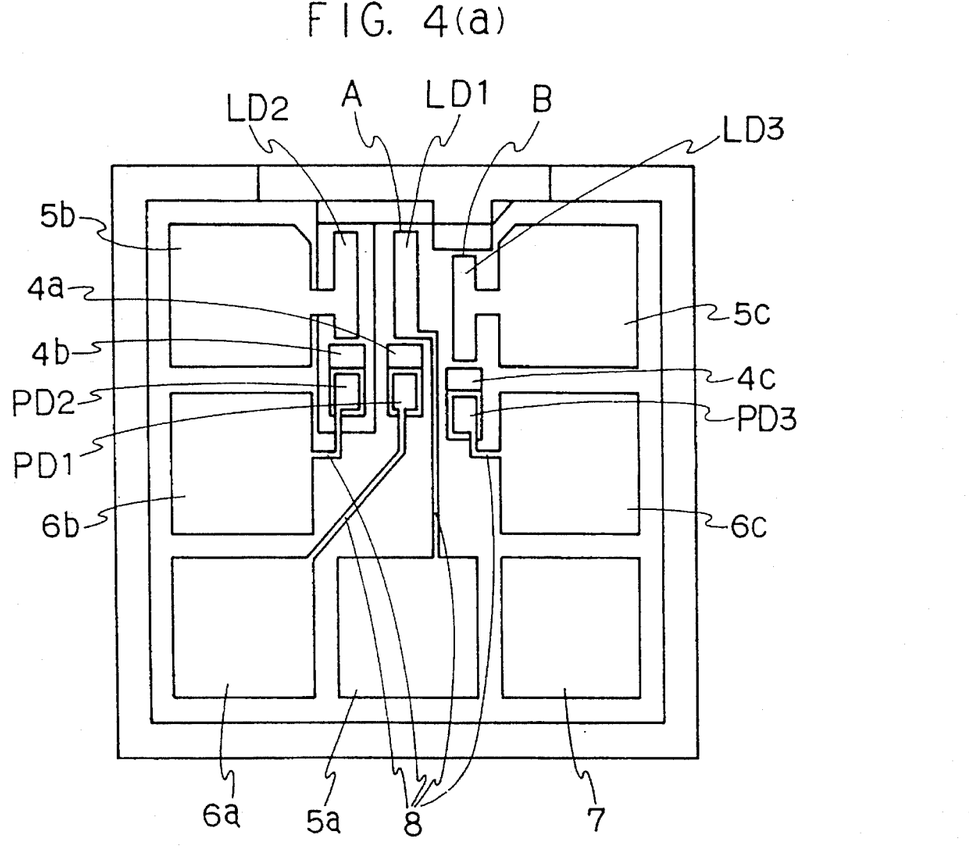
FIG. 4(a) is a plan view thereof.

Referring to FIG. 4(a) showing in plane an example of a semiconductor laser system for use in one embodiment of an optical pickup according to the present invention, the system comprises a semiconductor substrate 1 made of GaAs or the like, light-emitting parts LD1 to LD3 each formed of an LD having a pn junction in the direction perpendicular to the plane of the drawing and adapted to emit laser beam upward on the drawing. LD1 is an LD for detecting an RF signal through the state of a pit formed in an OD. LD1 and LD2 each has a step in the direction perpendicular to the plane of the drawing and emit laser beams for detection of signals from which a tracking error signal is formed.

Further, LD3 is formed with its light-emitting face B being coplanar with the light-emitting faces A of LD1 and LD2 as shown in FIG. 4(a) and used in cooperation with LD1 for the detection of focusing error signals. The horizontal plane of LD1 is coplanar with that of LD3, but the horizontal plane of LD1 is not coplanar with that of LD2.

Figure 4B:
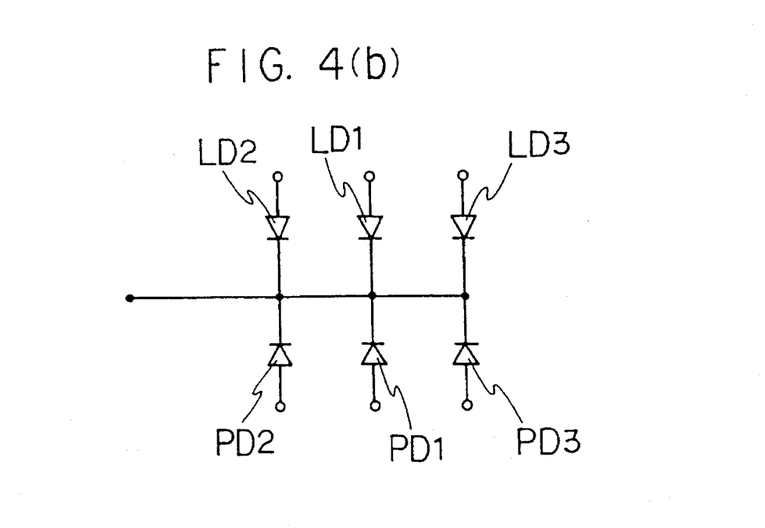
FIG. 4(b) is an equivalent circuit thereof.

On the opposite side of the light-emitting faces A and B, there are disposed photodetection parts PD1 to PD3 with respective intervening optical paths between the LDs and PDs, so that light running in the direction opposite to the light-emitting faces of LDs can be detected by respective PD. These PDs are formed by utilizing the pn junction defined in the fabrication process for the LDs, while the optical paths are formed by forming grooves by etching. Electrode pads 5a, 5b and 5c are connected to respective electrodes of LD1, LD2 and LD3, respectively, to apply voltage to each LD. Similarly, electrode pads 6a, 6b and 6c are connected to PD1, PD2 and PD3, respectively. An electrode pad 7 is one for common electrode. The relation between these diodes is shown in the equivalent circuit diagram of FIG. 4(b). The regions intermediate between adjacent LDs, between adjacent optical paths and between adjacent PDs are implanted with hydrogen ion or boron ion to form an isolation region between all the devices. The isolation region may be formed, besides by such ion implantation, by employing a mesa structure.

In the present embodiment one objective lens 32 is disposed in front of the semiconductor laser system having, for example, three light-emitting parts. The objective lens 32 is held by a lens holder 34 as shown in FIG. 8 and position-controlled by an electromagnetic coil 35 driven by tracking servo mechanism and focusing servo mechanism.

To efficiently detect a tracking error signal and a focusing error signal with precision, the present invention utilizes the fact that an error signal is modulated by a high frequency corresponding to repeating pits to extract only the high frequency component thereof. In turn, the extracted high frequency component is amplified and then detected as the error signal.

To be described first is a basic concept of a method for detecting tracking error signals. In the case of the semiconductor laser system having three LDs as shown in FIG. 4, a tracking error is detected using LD1 and LD2. There are two approaches to detect a variation in the oscillation state of an LD; one is a so-called E-SCOOP method which detects a variation in voltage across the terminals of the LD, and the other is a so-called L-SCOOP method which detects light emitted rearwardly from the LD with use of a photodetector such as a PD. Either method is based on a concept of utilizing an RF component of a signal which is superposed on a DC component thereof. Described herein is an example of the L-SCOOP method using a PD as a photodetector.

Figure 5A:
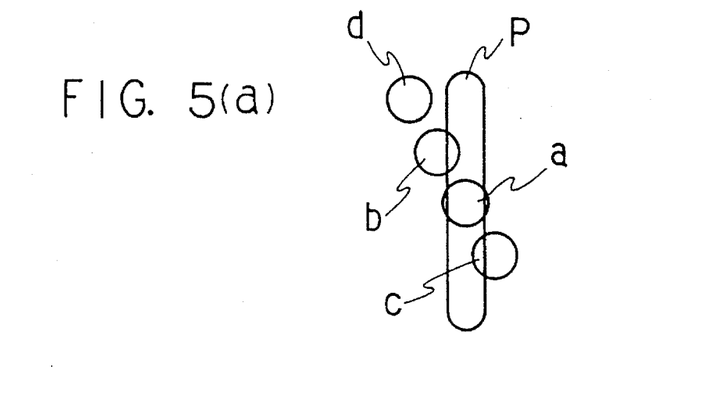
FIGS. 5(a) through 5(d) are schematic representations for illustrating how the emission state of an LD part is varied by returning light.

In forming a spot of light emitted from an LD onto an OD, when the spot is applied just onto a pit P formed on the OD as in the case indicated by a of FIG. 5(a), the reflectivity of the spotted light is small and, hence, the quantity of its returning light is also small, while when the spot is applied to a region other than the pit P as in the case indicated by d of FIG. 5(a), the reflectivity of the spotted light is large and, hence, the quantity of its returning light is also large. When the spot partially covers the pit P with the rest thereof on another region as in the case indicated by b or c of FIG. 5(a), the quantity of returning light varies depending on the area of the beam spot not on the pit P. If the quantity of returning light becomes large, the density of light in the cavity of the LD is increased thereby increasing the emission output thereof. Therefore, the output of the PD monitoring the quantity of light emitted from the LD varies depending on the position of the beam spot as shown in FIGS. 5(b) and 5(d) which show the output of the PD when the center of the beam spot is displaced in opposite directions perpendicular to the tracks.

Figure 5B:
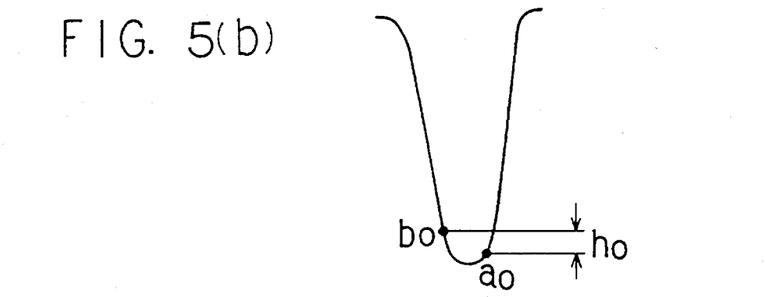
Figure 5C:
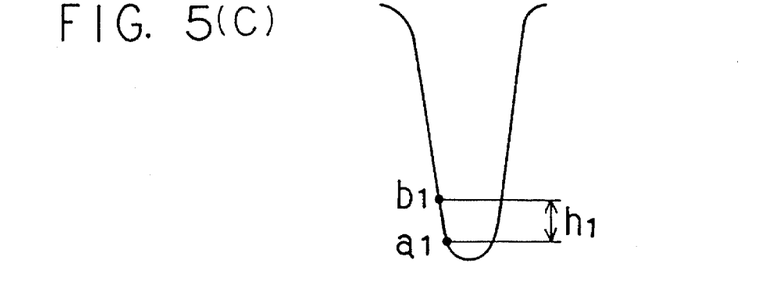
Figure 5D:
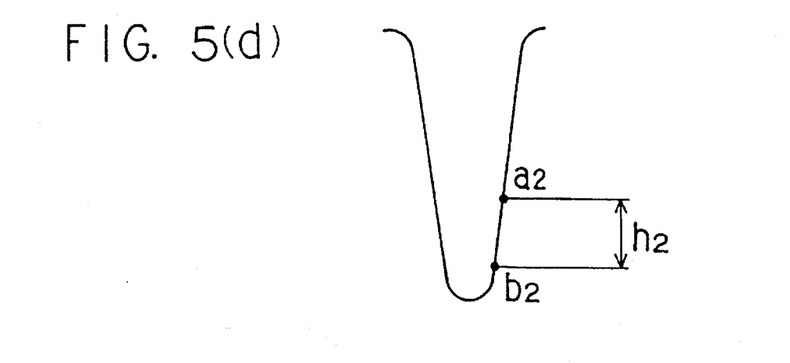

If the respective quantities of light emitted from LD1 and LD2 are detected by PD1 and PD2, respectively, it is found that when the difference $h_o$ between an output $a_o$ of PD1 and an output $b_o$ of PD2 is within a fixed range as shown in FIG. 5(b), the respective spots formed by LD1 and LD2 are in their right positions and, hence, no tracking error is occurring. When, as shown in FIG. 5(c), the difference between respective outputs $a_1$ and $b_1$ of PD1 and PD2, or $a_1-b_1$, is a negative value and its absolute value $h_1$ exceeds the fixed range, the position of the respective spot must be corrected rightwardly in FIG. 5(a). Such correction of a tracking error can be made by driving a servo motor which is directly responsive thereto. Further, when the difference between respective outputs $a_2$ and $b_2$ of PD1 and PD2, or $a_2-b_2$, is a positive value and its absolute value $h_2$ exceeds the abovementioned range, the position of the respective spot must be corrected leftwardly by the servo motor.

A focusing error can be corrected using LD1 and LD3 as in a manner similar to the above-mentioned. Specifically, when a beam becomes out of focus, the quantity of light returning to the cavity of the LD decreases and, hence, the output of the PD also decreases. Therefore, the direction in which the focusing is to be corrected can be determined depending on whether the difference between the respective outputs of the two PDs associated with LD1 and LD3 is positive or negative, and the correction of such a focusing error can be made by a servo motor so that such a difference would be within a predetermined range.

The output of each PD is characterized by its alternating current component which appears substantially periodically corresponding to repeating pits and, hence, the amplitude of alternating current component varies depending on the quantity of returning light. Accordingly, a variation due to the returning light appears as a variation corresponding to the repeating pits in a steady output of each LD, so that a variation in the output of each PD due to displacement of a track or the like appears as a variation of about 2 to about 50 μA in a direct current of about 200 μm. In the present invention such a current is converted to a voltage, and only the alternating current component is extracted therefrom and amplified. Further, the thus extracted alternating current component is converted to a direct current component, which is in turn compared with the counterpart one. Thus, the comparison can be achieved more easily and precisely than ever. It is noted that in the case of the E-SCOOP method a variation in the voltage of an LD is detected and the alternating current component is directly extracted therefrom and amplified and, hence, the current-to-voltage conversion is unnecessary.

The recording surface of an OD has repeating pits each having a length of about 0.86 to about 3.15 μm along a track. When laser beam is applied onto a pit, the quantity of its reflected light is small and, hence, the oscillation state of the LD is not varied so much. In contrast, when laser beam comes to be applied onto a region free of pit, the quantity of its reflected light is increased and, hence, the density of light in the cavity of the LD is also increased. This results in an increased quantity of light emitted from the LD. Such a variation is repeated corresponding to the repeating pits and, therefore, a signal detected by the detection part is in such a form that the high frequency component corresponding to the repeating pits are superposed on the DC component of a steady emission of the LD as shown in FIG. 6.

Figure 6A:
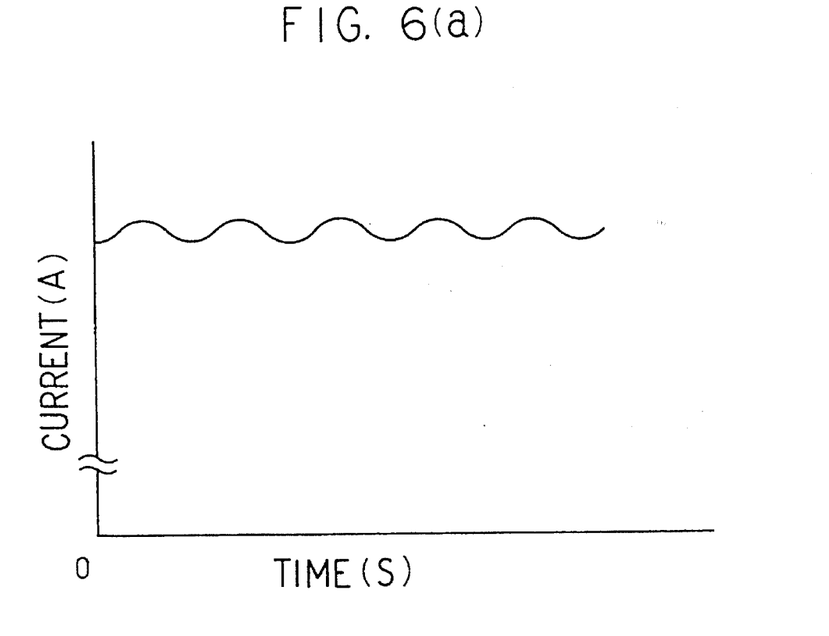
FIGS. 6(a) and 6(b) are graphic representations showing waveform of an output signal detected by a PD.

Assuming that the spot of laser beam from the light-emitting part is deviated from the center of a track to a large extent, an increased quantity of returning light causes the quantity of light emitted by the LD to increase. Since the quantity of returning light slightly decreases at a pit portion, then resumes its initial value at a region free of pit, the detected values are high as a whole with a small variation in amplitude, as shown in FIG. 6(a).

Figure 6B:
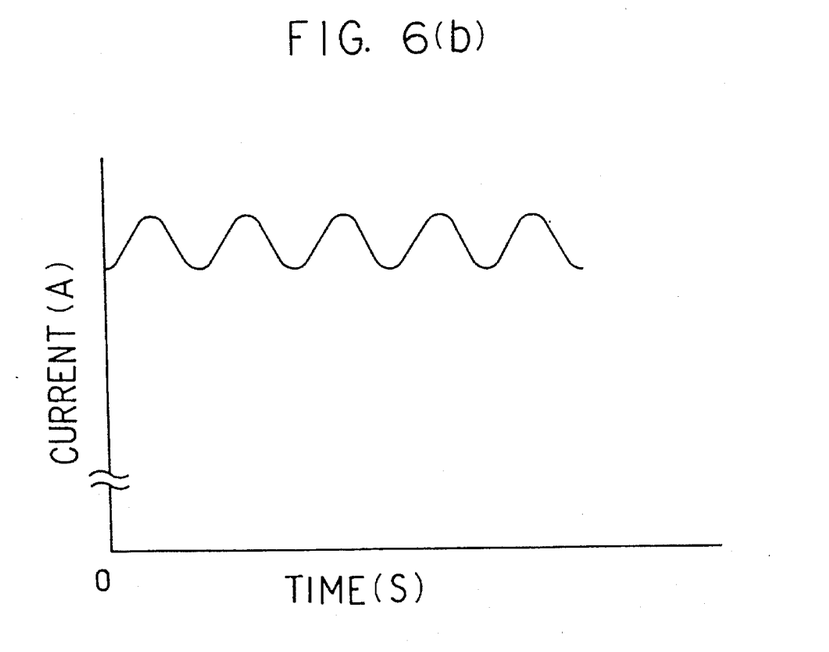

On the other hand, assuming that the spot of laser beam is situated on the center of a track, the quantity of light emitted by the LD is small and is not varied so much when the spot of laser beam is on a pit since the quantity of its returning light is small, while when the spot of laser beam is on a region intermediate adjacent pits, the quantity of returning light increases thereby increasing the output of the PD. This results in a large amplitude as shown in FIG. 6(b).

To be described next is an embodiment of a signal-processing part of the optical pickup according to the present invention which is capable of effectively processing tracking errors and focusing errors on the basis of the above-mentioned principle.

Figure 1A:
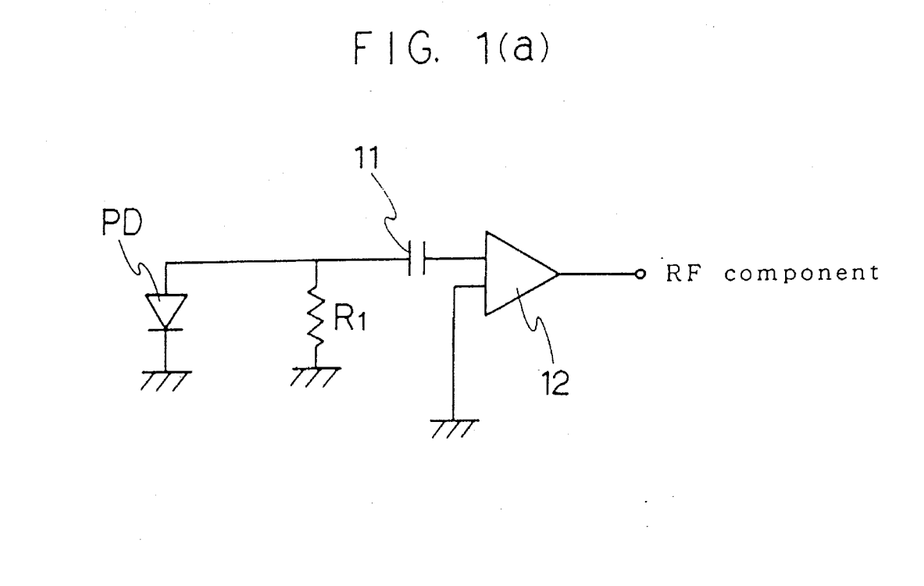
FIG. 1(a) is a circuit diagram of a circuit for extracting a high frequency component.
Figure 1B:
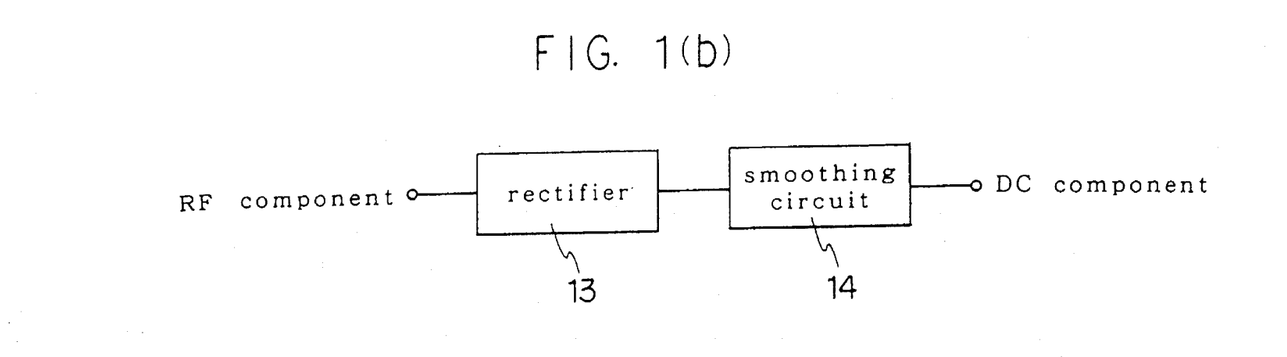
FIG. 1(b) is a block diagram of a circuit for converting the high frequency component into a DC component.
Figure 2:
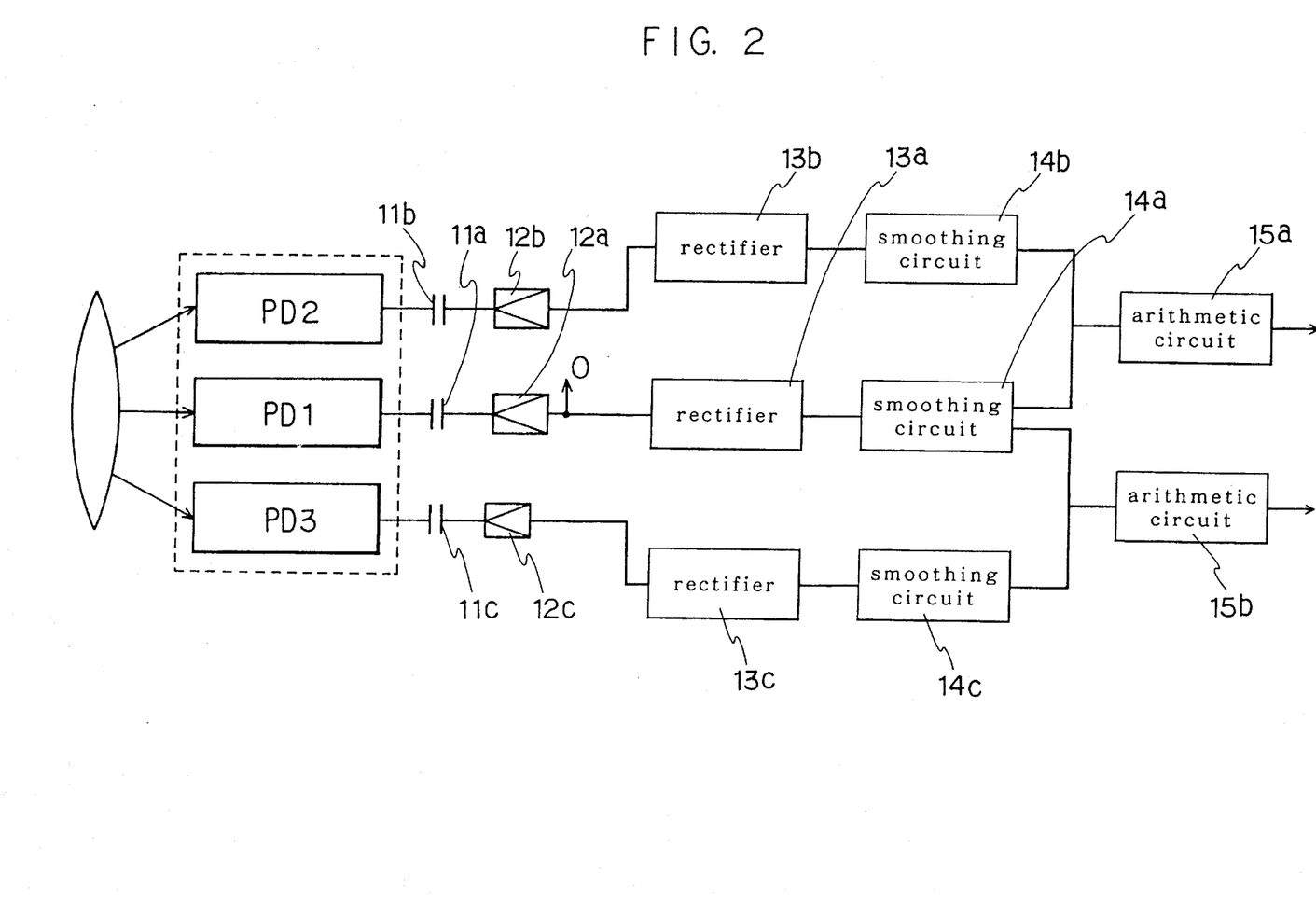
FIG. 2 is a block diagram showing a signal-processing part of one embodiment of an optical pickup according to the present invention.
Figure 3:
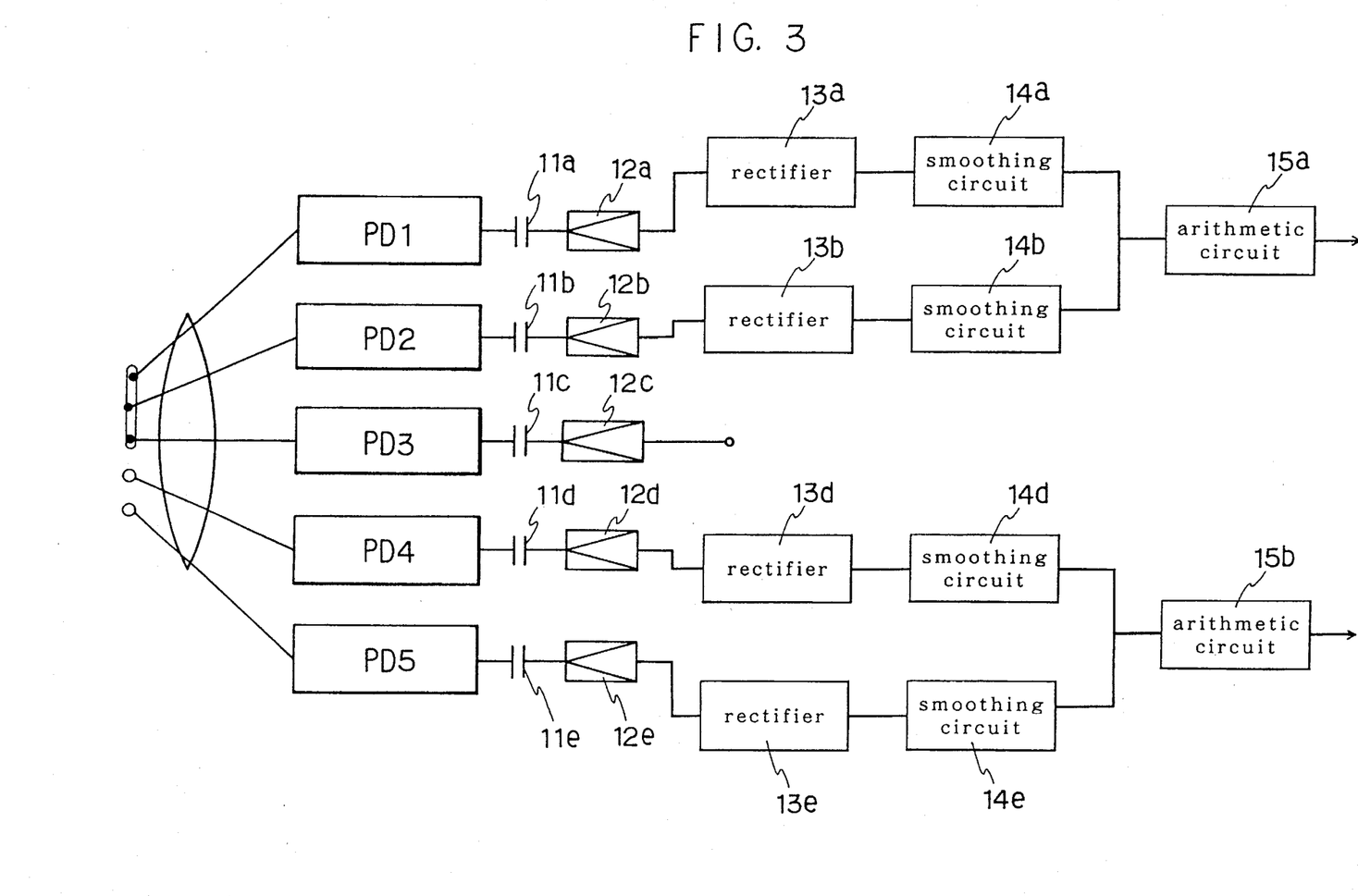
FIG. 3 is a block diagram showing a signal-processing part of another embodiment of an optical pickup according to the present invention.

FIG. 1(a) illustrates an embodiment of a circuit for extracting only the alternating current component from an output of a PD and then amplifying it to generate an RF signal. FIG. 1(b) is a block diagram showing an embodiment of a circuit for rectifying the RF signal to convert to a direct current component in proportion to the amplitude of the RF signal. FIG. 2 is a block diagram of an embodiment of the signal-processing part adapted for the case where the number of pairs of light-emitting part and photodetecter is three. FIG. 3 is a block diagram of an embodiment of the signal-processing part adapted for the case the number of pairs of light-emitting part and photodetector is five.

In FIGS. 1 to 3, numeral 11 (11a to 11e) denotes a capacitor for removing direct current component, numeral 12 (12a to 12e) denotes an amplifier, numeral 13 (13a to 13e) denotes a rectifier, numeral 14 (14a to 14e) denotes a smoothing circuit, numeral 15 (15a and 15b) denotes an arithmetic circuit for finding a difference, and a reference character $R_1$ denotes a resistor for current-to-voltage conversion. As described earlier, since a signal output from a PD has a direct current component upon which a high frequency component is superposed, the direct current component is removed by the capacitor 11 to extract only the high frequency component. The high frequency component is, in turn, converted to a voltage by the amplifier 12 to give an RF signal. Although the current component of the output of the PD is converted to a voltage using the resistor $R_1$, then the alternating current component is extracted and amplified in the present embodiment, this order of processing may be reversed.

To form tracking error signals or focusing error signals, the amplitude of the RF component of each output is rectified by the rectifier 13 to be converted into a DC component as shown in FIG. 1(b) so that the DC component can be compared with the counterpart one. If the RF component cannot be turned into a complete DC component with the rectifier 13 only, a smoothing circuit 14 are further provided after the rectifier 13.

If the number of pairs of light-emitting part and photodetector is three as shown in FIG. 2, the arithmetic circuit 15a finds the difference between a DC component of the output of PD2 for tracking error signal and that of the output of PD 1 for recorded signal and feeds it to a tracking servo motor as a drive signal. Similarly, the arithmetic circuit 15b finds the difference between a DC component of the output of PD1 and that of the output of PD3 and feeds it to a focusing servo motor as a drive signal. In this case an RF signal representative of recorded information is taken from the output terminal of the amplifier 12b connected to PD1. If the number of pairs of light-emitting part and photodetector is five as shown in FIG. 3, tracking error signal and focusing error signal can, respectively, be obtained from two different combinations of PDs other than the PD for recorded signal.

In the present invention, only the high frequency component is extracted from a signal detected by each PD and amplified and, hence, there is only a phase difference between signals which corresponds to a difference in location in the track direction between LD1 for recorded signal and LDs 2 and 4 for tracking error signal or LDs 3 and 5 for focusing error signal. Therefore, if the time axis is corrected of an RF output appearing at a section following the amplifier 12 connected to each PD to equalize the outputs in phase, followed by adding these outputs to each other, a large RF signal can be obtained with its noise reduced to $1/n^{1/2}$ where n is the number of outputs added together.

Although the foregoing embodiment has three LDs and three PDs for detecting an output signal of respective LD, two LDs for tracking error signal may be provided independently of LD1 for RF signal representative of recorded information, and these two LDs may be controlled so that respective beam spots would be on the opposite side edges of a pit P as shown in FIG. 7 to equalize the corresponding two outputs. Similarly, two LDs for focusing error signal may be provided independently of LD1 and controlled so that respective outputs would be equalized.

Further, although a PD is used for the photodetection part in the foregoing embodiment, any other element capable of detecting light is usable therefor, such as a PD having a pn junction formed by ion implantation or a resistor layer, as well as the PD having a pn junction formed in the process of fabricating the associated LD. Still further, in the case of the E-SCOOP method adapted to read a variation in the voltage of an LD instead of detecting the quantity of light emitted by the LD, it is needless to say that the respective photodetection parts for tracking error signal and focusing error signal are unnecessary except for one for an APC operation.

As has been described, the present invention, even when applied to the SCOOP method, is able to extract and amplify only the high frequency component on which a tracking or focusing error signal is superposed. This leads to a simplified but precise signal processing which assures a rapid and precise detection of signals. Further, since the present invention simplifies the structure of an optical pickup, a small size, high quality, inexpensive optical pickup can be realized which keeps up with the recent trend of reducing in size of an optical disk and of increasing in operation speed.

Though several embodiments of the present invention are described above, it is to be understood that the present invention is not limited only to the above-mentioned, various changes and modifications may be made in the invention without departing from the spirit and scope thereof.

What is claimed is:

1. An optical pickup adapted to read out information signals recorded in an optical disk, comprising at least three light-emitting parts each capable of emitting a laser beam, at least three detection parts, each of which is provided in association with each of the light-emitting parts for detecting a variation of an output in the light-emitting part associated therewith which is caused by the laser beam reflected by the optical disk wherein the detection parts provide outputs corresponding to the variation, a tracking servo mechanism and a focusing servo mechanism, the servo mechanisms being adapted to be driven in response to the outputs from the detection parts for correcting a tracking error and a focusing error of the laser beam, wherein the detection parts each connected to a capacitor and an amplifier sequentially, at least two of the detection parts being each further connected to a rectifier after the amplifier to turn each of the outputs from the detection parts into a direct current component signal, and wherein the tracking servo mechanism and/or the focusing servo mechanism is driven corresponding to a result of comparison between two of the direct current component signals output by the respective rectifiers.

2. The optical pickup of claim 1, wherein the detecting parts include photodiodes provided on the back side of the light-emitting parts and a current to voltage converting means for transforming an output current to a voltage, and wherein an output voltage component from said current to voltage converting means is connected to the amplifier.

3. The optical pickup of claim 1, wherein light-emitting part is formed with a laser diode, each of the detecting parts is a means for detecting a voltage applied to each of the laser diode.

4. The optical pickup of claim 1, wherein at least three pieces of said light-emitting parts and the detecting parts are respectively formed with the laser diodes and the photodiodes, wherein at least two pieces of said laser diodes are arranged in such a manner that one vertical plane to the tracking direction of the light-emitting surface of one diode is not coplanar with another vertical plane of the light-emitting surface of another diode, and wherein at least two pieces of said laser diodes are arranged in such a manner that one horizontal plane is not coplanar with another horizontal plane of the light-emitting surface of another diode.

5. The optical pickup of claim 1, wherein the number of pairs of the light-emitting parts and the detection parts are three, and wherein the direct current component signal derived from the output of the detection part of a first pair of the three pairs is compared with that derived from the output of the detection part of a second pair of the three pairs to form a tracking servo signal and with that derived from the output of the detection part of a third pair of the three pairs to form a focusing servo signal, the amplifier associated with the first pair outputting an RF signal representative of a signal recorded in the optical disk.

6. The optical pickup of claim 1, wherein the number of pairs of the light-emitting parts and the detection parts are at least three, and which further comprises a time axis correction circuit branched from the output of the amplifier connected to the detection part of a second pair of the at least three pairs for making coincide a time axis of a second signal detected by the detection part of the second pair with that of a first signal detected by the detection part of a first pair of the at least three pairs, and an adder for adding the second signal corrected by the time axis correction circuit to the first signal to output an RF signal representative of a signal recorded in the optical disk.

\* \* \* \* \*